July 27, 1937.  W. H. FRANK  2,088,106
METHOD OF MAKING BUS DUCT
Filed May 6, 1935  2 Sheets-Sheet 1

INVENTOR.
William H. Frank
BY
Daniel Cullen
ATTORNEY.

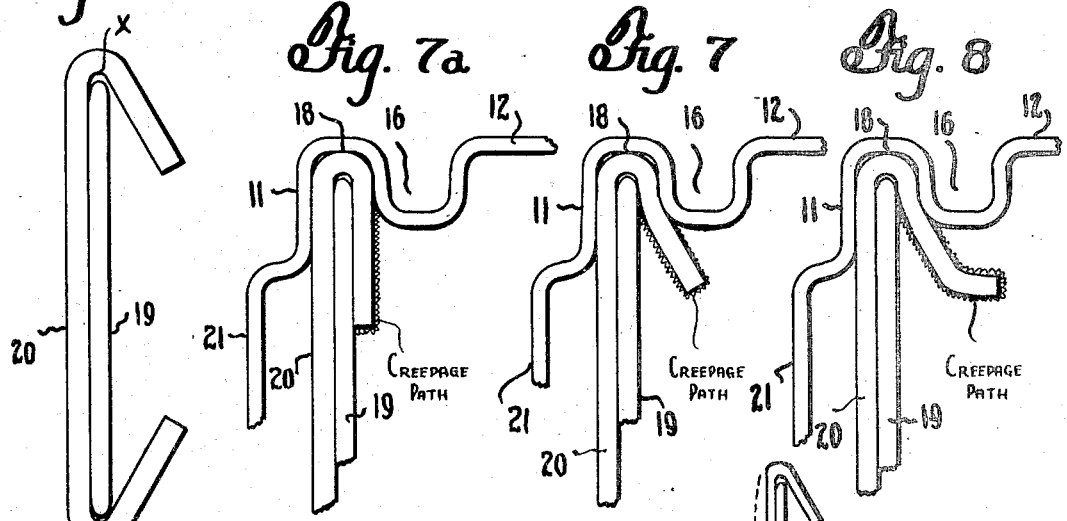
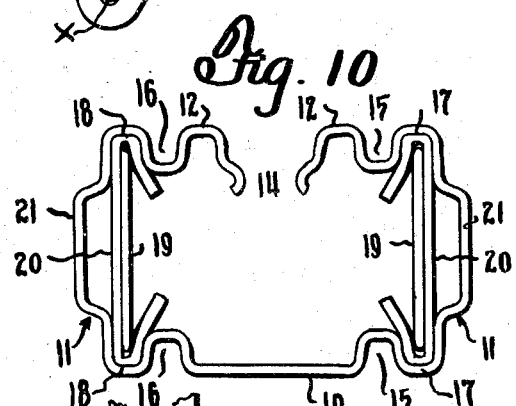
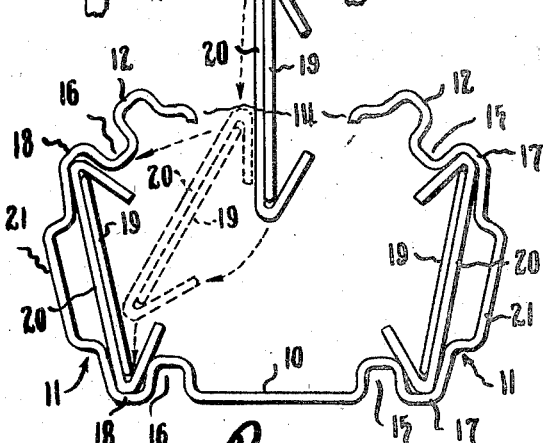
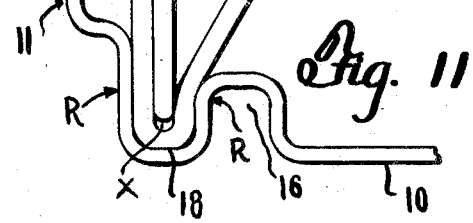

Patented July 27, 1937

2,088,106

UNITED STATES PATENT OFFICE 2,088,106

METHOD OF MAKING BUS DUCT

William H. Frank, Detroit, Mich.

Application May 6, 1935, Serial No. 20,114

13 Claims. (Cl. 29—155.5)

This application relates to methods of manufacture of slotted tubular bus duct.

In application Serial No. 723,053 of William H. Frank, filed April 30, 1934, there is disclosed a tubular bus duct provided with a narrow slot through which rides part of a trolley whose contacts engage bus bars within the duct. This application particularly relates to methods of fabricating bus duct of the type shown in that application.

In addition, this application relates to novel details of construction of bus duct, such details distinguishing the finished products of the methods here outlined from the bus duct shown in the earlier application.

The principal characteristic of the method here disclosed is the characteristic that the duct is first formed semi-closed with its slot wide open, after which bus bars are disposed within the duct adjacent the side walls thereof through the wide open slot of the semi-closed duct, whereupon the duct is closed in to narrow the slot and thus to hold the bus bars in place.

For an understanding of the methods forming the instant application and in addition the finished product of such methods, reference may be had to the appended drawings which are to be studied in conjunction with the annexed specification.

In these drawings,

Fig. 5 is an enlarged scale end view of a length of bus duct after the first step of manufacture and when it is in the semi-closed wide open slot condition;

Fig. 6 is an end view of a compound ribbon of bus bar and insulation ready for disposal within the semi-closed duct of Fig. 5;

Fig. 7 shows the relation of the compound ribbon to the adjacent duct wall and illustrates the extraordinary creepage path provided by having the edges of the insulation spaced away from the surfaces of the bus bar;

Fig. 7a is a similar view showing the edges of the insulation in juxtaposition to the surfaces of the bus bar, as in application Serial No. 723,053, illustrating the somewhat shorter creepage path provided by such construction;

Fig. 8 is a similar view of a modification wherein the edges of the insulation are flanged to increase the creepage path;

Fig. 9 is a view showing the manner of insertion of the compound ribbon of Fig. 6 into the duct of Fig. 5;

Fig. 10 is a large scale view of a finished duct;

Fig. 11 is a greatly enlarged scale view illustrating the lines of pressure of the rollers which close in the dihedral angles receiving the edges of the compound ribbon of Fig. 6.

Figure 1:
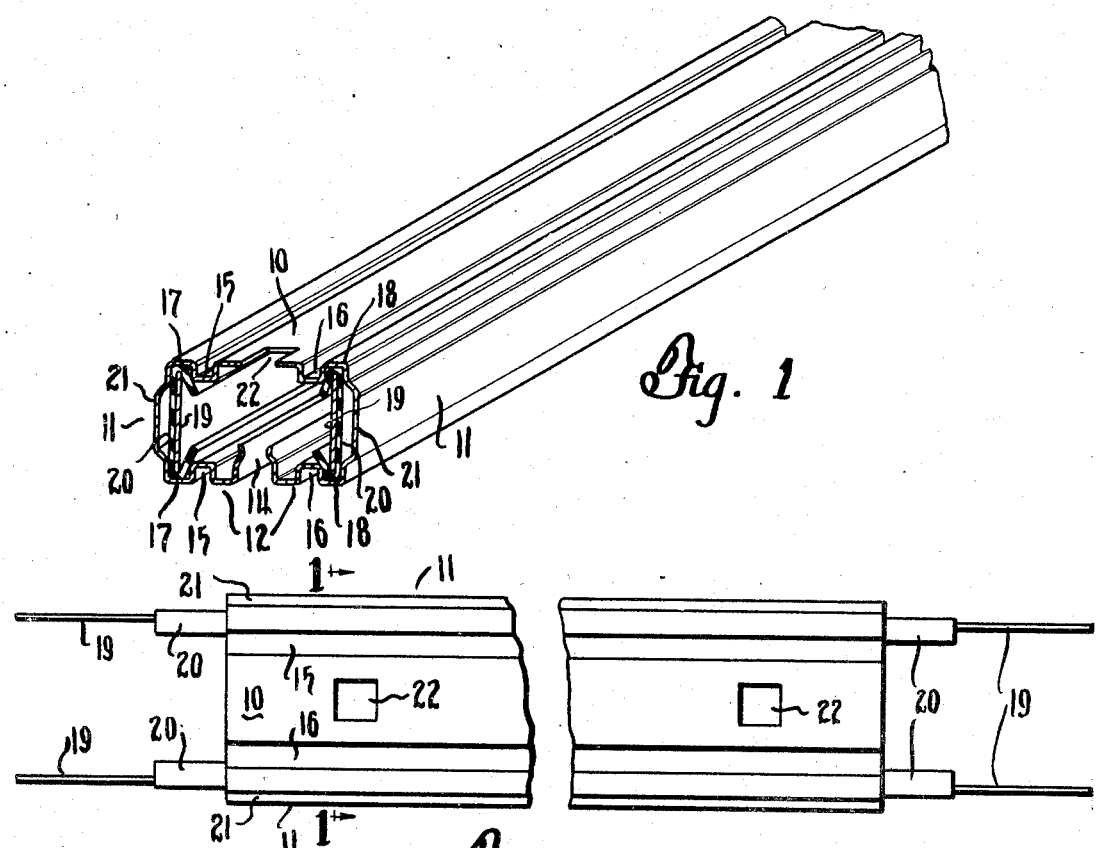
Fig. 1 is an isometric view as if in section on line 1—1, Fig. 2, of bus duct of the character forming the finished product of the methods herein disclosed.

To aid in understanding the methods of this application, attention should first be given to the finished product shown best in Figs. 1-4 and 10.

The finished product

The finished product is a length of duct having a base wall 10, sides 11, and a wall 12 divided into two parts by a slot 14.

The base wall and the slotted wall have inwardly projecting beads 15—16 between which and the sides are dihedral angles 17—18 which receive the edges of bus bars 19 enshrouded in insulation 20 of folded ribbon form, the edges of the insulation being folded around those of the bus bars and spaced from each other to expose stripes of the bus bars, and also spaced from the bus bars to provide extraordinary creepage paths (compare Figs. 7-7a) between the bus bar stripes and the duct. The edges of the insulation may be flanged (Fig. 8) or unflanged (Fig. 7) as desired. It is understood that in the manufacture of electrical apparatus, care must be taken to have the path, referred to as the creepage path, between parts of different polarity, measured along adjacent surfaces, to be as long as possible, so that in the event moisture and dirt collect on these surfaces, bridging of the parts of different polarity through such moisture and dirt will be as difficult as possible.

Although the insulation strips between their folds and their edges, are shown as having gradual bends where they leave the grooves of angles 17—18, they might well be perfectly flat and planar in these parts, and the existence or nonexistence of bends here is determined by the relative dimensions of the insulation and the beads. It is preferred, though not necessary, to have a slight clearance between the insulation and the duct material so that no bends will be existent.

The sides have outwardly projecting beads 21 which impart a degree of compressibility to the sides for reasons that will be apparent.

Figure 2:
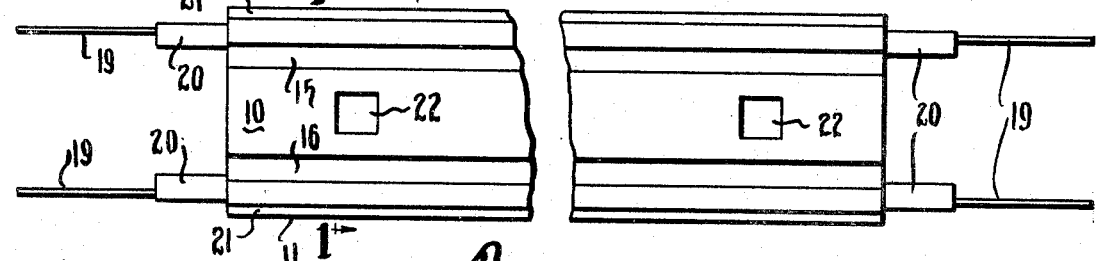
Fig. 2 is a base plan view of a length of bus duct.
Figure 3:
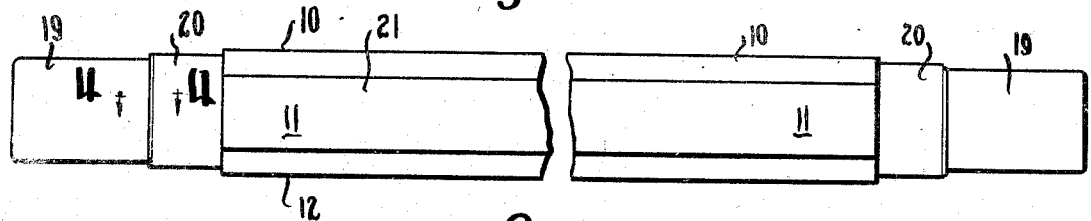
Fig. 3 is a side elevational view of a length of bus duct.
Figure 4:
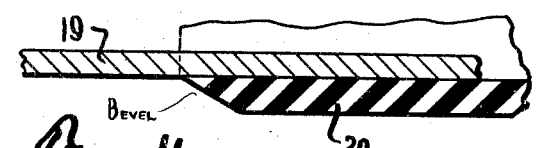
Fig. 4 is an enlarged scale section as if on line 4—4 of Fig. 3.

Near the ends of the duct, in the flat part of the base, between beads 15—16, are holes 22. These holes are provided for receiving locking lugs on coupler sleeves which couple ends of duct sections to one another and form a continuous duct run. The insulation and the bus bars project beyond the ends of the duct a predetermined degree, as seen in Figs. 2–3, and the ends of the insulation are beveled or scarfed, as seen in Fig. 4.

Inasmuch as this application relates to a method for making the finished product, the steps of the method will now be described.

Step #1

A continuous flat ribbon or strip of duct material (steel), plated or unplated, as desired, is passed longitudinally through successive rollers and rolled into the cross section of Fig. 5 to have its side walls 11 diverge outwardly from the base 10; dihedral angles 17—18 will move open, dihedral angles 17—18 at the slotted wall 12 will be farther away from the base angles 17—18, and the parts of wall 12 will be farther apart from the base and from each other, than when the duct is finished.

The duct is cut off in suitable lengths (9 ft. 9 in.) and the lengths are pierced with the holes 22 at suitable distances (¾ in.) from the ends of the duct lengths.

Step #2

A continuous ribbon of bus bar is passed over a continuous ribbon of insulating material (fiber, latex, etc.) and the edges of the insulation are gradually rolled over the edges of the bus ribbon. The edges of the bus ribbon will be spaced from the folds of the insulation, as seen at X, Fig. 6, in the compound ribbon thus formed.

The continuous compound ribbon is cut off in suitable lengths, (10 ft. 1 in.) greater than the lengths of duct.

Step #3

Two lengths of compound ribbon are then inserted into a length of duct, through the wide open slot, the manner of insertion being as shown in Fig. 9. Their upper edges will snap past the lower parts of beads 15—16 when their own lower edges are in angles 17—18 at the base and will snap into angles 17—18 of the slotted wall, there to remain somewhat firmly.

When snapped into the duct, the ends of the compound ribbons project beyond the ends of the duct suitable distances (2 in.).

Step #4

A length of duct containing two lengths of compound ribbon, is then passed longitudinally through guides and rollers so that the dihedral angles are closed in and moved towards each other, so that the sides move towards each other, and so that the slot 14 is closed, to form the finished cross section. The rollers that close in the sides of the dihedral angles engage the sides of these angles on lines R, R, Fig. 11, above edges of the bus bars, and slightly crimp in these angles, to clamp the bus bars in the duct, without materially decreasing the spaces X between the bus edges and the insulation folds and without creating the possibility of such insulation being sheared at the folds by the bus edges. The resilience of the sides, provided by the beads, 21, facilitates such crimping-in action.

Step #5

The ends of bus bars and their insulation, at the end of a duct length, are then put into a cut off die that pilots from the hole 22. Floating knives of the die cut off the bus bars at a proper distance (2¼ in.) from the square hole and floating knives of the die pinch off, in bevel cuttings, the insulation at a proper distance (1¼ in.) from the square hole.

The corners of the bus bars are then cut off in fillets, as shown in Fig. 3.

Summary

The foregoing steps outline a method found suitable for manufacture of slotted bus duct of the type shown, and while slight changes might be made to modify details of such steps, these steps, in general, represent the inventions sought to be protected by the claims which follow.

I claim:

1. A method for making hollow tubular duct of the character including a base wall, side walls, and a split wall whereof the cross sectional area of the interior of the duct is many times that of the bus bar, and wherein bus bars are disposed adjacent the sides with their edges within the dihedral angles at the intersections of duct walls which comprises forming semi-closed hollow tubular duct with one wall longitudinally split and with the split wall dihedral angles spaced apart more than they are intended to be in the finished product, disposing bus bars in place with their edges in the dihedral angles, and then biasing duct walls to move the split wall dihedral angles towards each other.

2. A method for making hollow tubular duct of the character including a base wall, side walls, and a split wall whereof the cross sectional area of the interior of the duct is many times that of the bus bar, and wherein bus bars are disposed adjacent the sides with their edges within the dihedral angles at the intersections of duct walls which comprises forming semi-closed hollow tubular duct with one wall longitudinally split and with the split wall dihedral angles open more than they are intended to be in the finished product, disposing bus bars in place with their edges in the dihedral angles, and then closing in the split wall dihedral angles.

3. A method for making hollow tubular duct of the character including a base wall, side walls, and a split top wall whereof the cross sectional area of the interior of the duct is many times that of the bus bar, and wherein bus bars are disposed adjacent the sides with their edges within the dihedral angles at the intersection of duct walls which comprises forming semi-closed hollow tubular duct with one wall longitudinally split and with the top dihedral angles spaced apart more than they are intended to be in the finished product, disposing bus bars in place with their edges in the dihedral angles by first inserting bus bar edges in the base dihedral angles and then moving other bus bar edges into the top dihedral angles, and then biasing duct walls to move the top dihedral angles towards each other.

4. A method for making hollow tubular duct of the character including a base wall, side walls, and a split top wall whereof the cross sectional area of the interior of the duct is many times that of the bus bar, and wherein bus bars are disposed adjacent the sides with their edges within dihedral angles at the intersections of duct walls which comprises forming semi-closed hollow tubular duct with one wall longitudinally split and with the top wall dihedral angles open more than they are intended to be in the finished product, disposing bus bars in place with their edges in the dihedral angles by first inserting bus bar edges in the base dihedral angles and then moving other bus bar edges into the top dihedral angles, and then closing in the top wall dihedral angles.

5. A method for making hollow tubular duct of the character including a base wall, side walls, and a split top wall whereof the cross sectional area of the interior of the duct is many times that of the bus bar, and wherein bus bars are disposed adjacent the sides with their edges within the dihedral angles at the intersections of duct walls which comprises forming semi-closed hollow tubular duct with one wall longitudinally split and with the split wall dihedral angles spaced from the base more than they are intended to be in the finished product, disposing bus bars in place with their edges in the dihedral angles, and then biasing duct walls to move the split wall dihedral angles towards the base.

6. A method for making hollow tubular duct of the character including a base wall, side walls, and a split top wall whereof the cross sectional area of the interior of the duct is many times that of the bus bar, and wherein bus bars are disposed adjacent the sides with their edges within the dihedral angles at the intersections of duct walls which comprises forming semi-closed hollow tubular duct with one wall longitudinally split and with the split wall dihedral angles spaced from the base and open more than they are intended to be in the finished product, disposing bus bars in place with their edges in the dihedral angles, and then biasing the duct walls to move the split top wall dihedral angles towards the base and simultaneously to close them in.

7. A method for making hollow tubular bus duct whereof the cross sectional area of the interior of the duct is many times that of the bus bar comprising forming a longitudinally beaded, partially formed, semi-closed hollow tubular duct having one wall longitudinally split, disposing a bus bar thereafter in the partially formed and semi-closed duct with an edge of the bus bar received in a bead of the duct, then closing in the semi-closed duct around the bus bar to complete the formation of the duct, to dispose a bead of the duct around another edge of the bus bar to hold the bus bar in place, and to narrow the split.

8. A method for making hollow tubular bus duct whereof the cross sectional area of the interior of the duct is many times that of the bus bar comprising forming a longitudinally beaded, partially formed, semi-closed hollow tubular duct having one wall longitudinally split, disposing a bus bar thereafter in the partially formed and semi-closed duct with an edge of the bus bar received in a bead of the duct, then closing in the semi-closed duct around the bus bar to complete the formation of the duct, to dispose a bead of the duct around another edge of the bus bar to hold the bus bar in place, and to narrow the split, the beads being on opposite parallel walls of the duct, which walls are bridged by the bus bar, one of the walls being the split wall of the duct.

9. A method for making hollow tubular bus duct whereof the cross sectional area of the interior of the duct is many times that of the bus bar comprising forming a partially formed, semi-closed hollow tubular duct having one wall longitudinally split, disposing a bus bar thereafter in the partially formed and semi-closed duct with an edge of the bus bar disposed against one wall of the duct, then closing in the semi-closed duct around the bus bar to complete the formation of the duct, to dispose a wall thereof against another edge of the bus bar to hold the bus bar in place, and to narrow the split.

10. A method for making hollow tubular bus duct whereof the cross sectional area of the interior of the duct is many times that of the bus bar comprising forming a partially formed, semi-closed hollow tubular duct having one wall longitudinally split, disposing a bus bar thereafter in the partially formed and semi-closed duct with an edge of the bus bar disposed against one wall of the duct, then closing in the semi-closed duct around the bus bar to complete the formation of the duct, to dispose a wall thereof against another edge of the bus bar to hold the bus bar in place, and to narrow the split, the beads being on opposite parallel walls of the duct, which walls are bridged by the bus bar, one of the walls being the split wall of the duct.

11. A method for making hollow tubular bus duct whereof the cross sectional area of the interior of the duct is many times that of the bus bar comprising forming a partially formed, semi-closed hollow tubular duct having one wall longitudinally split, disposing a bus bar thereafter in the partially formed and semi-closed duct with an edge thereof against a wall of the duct, then closing in the semi-closed duct around the bus bar to dispose a wall of the duct against a second edge of the bus bar, to the desired size and without using the bus bar as a mandrel, to complete the formation of the duct and to narrow the split.

12. A method for making hollow tubular duct whereof the cross sectional area of the interior of the duct is many times that of the bus bar comprising forming a partially formed, semi-closed hollow tubular duct having a bottom wall, two side walls, and a longitudinally split top wall, then disposing a bus bar in the duct with an edge thereof against a wall of the duct, then closing in the semi-closed duct by pivotally moving the sides toward the bottom and closing in the bottom-side dihedral angles without flexing the bottom or sides except at these angles to dispose a wall of the duct against a second edge of the bus bar.

13. A method for making hollow tubular bus duct whereof the cross sectional area of the interior of the duct is many times that of the bus bar comprising forming a partially formed and semi-closed hollow tubular duct, disposing bus bars thereafter in the partially formed and semi-closed duct with the edges of the bus bar disposed against walls of the duct, and then completing the forming of and closing in the semi-closed duct around the bus bar to hold the bus bar in place, with its edges against walls of the duct.

WILLIAM H. FRANK.